United States Patent
Miao et al.

(10) Patent No.: US 8,176,192 B2
(45) Date of Patent: May 8, 2012

(54) NETWORKED TRANSMISSION SYSTEM AND METHOD FOR STREAM DATA

(75) Inventors: Yu-Ben Miao, Tainan (TW); Yun-Shuai Yu, Changhua (TW); Chung-Shiang Lin, Kaohsiung (TW); Ce-Kuan Shieh, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 529 days.

(21) Appl. No.: 12/119,503

(22) Filed: May 13, 2008

(65) Prior Publication Data
US 2009/0172179 A1     Jul. 2, 2009

(30) Foreign Application Priority Data
Dec. 31, 2007  (TW) .............................. 96151598 A

(51) Int. Cl.
*G06F 15/16* (2006.01)
(52) U.S. Cl. ........ 709/231; 709/201; 709/249; 725/118; 370/230
(58) Field of Classification Search .................. 709/231, 709/201, 249; 725/118; 370/230
See application file for complete search history.

(56) References Cited

U.S. PATENT DOCUMENTS

| | | | | |
|---|---|---|---|---|
| 6,377,972 B1 * | 4/2002 | Guo et al. | ...................... | 709/201 |
| 6,718,361 B1 | 4/2004 | Basani et al. | | |
| 7,027,460 B2 | 4/2006 | Iyer et al. | ...................... | 370/429 |
| 2002/0116462 A1 | 8/2002 | DiGiano et al. | | |
| 2003/0161299 A1 | 8/2003 | Rao et al. | | |
| 2005/0005300 A1 | 1/2005 | Putterman et al. | ............... | 725/89 |
| 2005/0183120 A1 | 8/2005 | Jain et al. | ......................... | 725/46 |

FOREIGN PATENT DOCUMENTS
JP         2006-074781         3/2006

OTHER PUBLICATIONS

Lemp: Lightweight Efficient Multicast Protocol for Video on Demand, Panayotis Fouliras et al., P1226~P1231, 2004 ACM Symposium on Applied computing.
A Peer-to-Peer On-Demand Streaming Service and Its Performance Evaluation, Yang Guo et al. P649~P652, In Proceedings of the IEEE ICME 2003.
Chi, Huicheng and Zhang, Qian, Efficient Search in P2P-based Video-on-Demand Streaming Service, IEEE Int. Conf on Multimedia and Expo. Jul. 9, 2006, p. 565-568.

(Continued)

*Primary Examiner* — Kenny Lin
*Assistant Examiner* — Farhad Ali
(74) *Attorney, Agent, or Firm* — Lin & Associates IP, Inc.

(57) ABSTRACT

Disclosed is a networked transmission system and method for stream data. The system comprises a network, a streaming server and an ordered series of a first up to n-th cooperative-sharing groups. There is a cooperative relationship among all users' terminals in a cooperative-sharing group. The streaming server provides a plurality of programs with stream data, each program being divided into one or more audio/video clips by a time-slot unit. The streaming server transmits the one or more audio/video clips to the leader node of the first cooperative-sharing groups. The leader node of each cooperative-sharing group transmits the currently received audio/video clip to the users' terminals within the same cooperative-sharing group, and passes the received audio/video clip to the leader node of the next cooperative-sharing group after one time slot.

20 Claims, 7 Drawing Sheets

OTHER PUBLICATIONS

Ye, Baoliu, Guo, Minyi and Xue, Jingling, Coopstream: A Cooperative Cache Based Streaming Schedule Scheme for On-demand Media Services on Overlay Networks, IEEE Int. Conf. on Parallel Processing. Aug. 14, 2006, p. 577-584.

He, Yuan and Liu, Yunhao, Supporting VCR in Peer-to-Peer Video-On-Demand, IEEE Int. Conf. on Network Protoco Is, Oct. 16, 2007.

Taiwan Patent Office, Office Action, Patent Application Serial No. TW096151598, Oct. 13, 2011, Taiwan.

* cited by examiner

NETWORKED TRANSMISSION SYSTEM AND METHOD FOR STREAM DATA

FIELD OF THE INVENTION

The present invention generally relates to a networked transmission system and method for stream data.

BACKGROUND OF THE INVENTION

Personal video recorder (PVR) used to require a large amount of storage space so that the user could watch on-demand programs. U.S. Publication No. 2005/0005300 disclosed a networked personal video recorder service using a plurality of recording servers in a network to form a large network video recorder to serve each client directly to meet the on-demand video watch by the users. U.S. Publication No. 2005/0183120 disclosed a distributed multimedia technology by installing a server in a network to receive the clients' request to pre-record programs and display the recorded programs at a specified time slot. The server of the client-server architecture may easily become the performance bottleneck. The service providers must upgrade the servers as the number of clients increases.

The recent popularity of sharing through P2P networks has made P2P network becoming a large shared storage space. For example, P2Cast technology uses P2P patching to provide video on demand (VoD) service, which divides the users into several groups according to the join time of the users. Thereby, the users in the same group have the join time close to one another. Each group forms a multicast tree. Streaming server will serve the root of each multicast tree. The users in the same group may coordinate with other users. However, each group is independent. The difference between P2VoD technology and P2 Cast technology is that the groups in P2VoD technology may coordinate with other groups. The video session currently watched by the first group may be watched by the second ground later. In other words, all the users of I group may serve the users of I+1 group. However, when the number of users in the first group is substantially smaller than the second group, many users will not be served. In addition, when a large number of users joining the first group, the workload on the server will be also large.

Direct Stream technology is based on P2Cast technology, with the addition of allowing users to use VCR function, by using different multicast trees to change the playing progress. However, as the P2Cast technology shown in FIG. 1, in addition to a streaming server 110, one or more directory servers 120 must be included to record the status of each node in the network, such as watching progress, buffer size, network address, service capability, and so on. When user 132 executes the VCR function to change the playing progress, another parent node 131 with the similar viewing progress provides the program session to user 132. The objective of directory server is to find the parent node matching the criterion. However, as the performance or the number of the directory server will be influenced by the number of users, the directory server may also become the bottleneck, and the cost will also increase.

The network TV software currently using P2P technology, such as PPLive, PPStream, AntTV, does not support VoD system and VCR functions. The playing progress for each user must be synchronous with the broadcasting progress. In other words, all the users watching the same program have the same playing progress.

SUMMARY OF THE INVENTION

According to the present invention, the disclosed exemplary embodiments may provide a networked transmission system and method for stream data to realize the PVR service.

In an exemplary embodiment, the disclosed is directed to a networked transmission system for stream data, comprising a network, a streaming server and an ordered series of a first up to n-th cooperative-sharing groups. Each cooperative-sharing group consists of a plurality of user terminals, and at least a user terminal is the leader node of the cooperative-sharing group. All the user terminals of a cooperative-sharing group establish a cooperative multicast relation. The streaming server provides a plurality of stream data programs, with each stream data program being divided into one or more stream data segments of time length. The streaming server uses the network to propagate the stream data segments to the leader node of the first cooperative-sharing group. The leader node of each cooperative-sharing group multicasts the received data segments to the user terminals in the same cooperative-sharing group. After a period of one time length, the previous stream data segments will be relayed to the leader node of the next cooperative-sharing group.

In another exemplary embodiment, the disclosed is directed to a networked transmission method for stream data, comprising: defining a time length TS, and dividing each stream data of a plurality of stream data into a plurality of stream data segments by taking the time length TS as a unit; taking the time length TS as a unit to define a plurality of cooperative-sharing groups numbered from 1 to n, with each cooperative-sharing group consisting of a plurality of user terminals; for each cooperative-sharing group, selecting at least a user terminal from the user terminals in the cooperative-sharing group as the leader node of the cooperative-sharing group; at each time length TS, propagating a stream data segment to the leader node of the first cooperative-sharing group; and the leader node of each cooperative-sharing group multicasting the current received stream data segment to all the user terminals of the same cooperative-sharing group, and after a time length TS, relaying the previous stream data segment to the leader node of the next cooperative-sharing group.

In the disclosed embodiments in accordance with the present invention, the streaming server includes a memory space for recording the network address of the leader node of each cooperative-sharing group. The user terminal may execute the joining to the system, changing the playing progress, and leaving the system. The networked transmission system of the present invention may provide the users with the VCR functions, such as random seek and pause.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

The exemplary embodiments in accordance with the present invention disclose a networked transmission system and method for transmitting stream data to a large number of online users for watching. The networked transmission technology uses the P2P network to divide the users into groups, such as, dividing the users into groups according to their viewing progress. Also, the disclosed embodiments according to the present invention set up an inquiry center, i.e., streaming server, to record the users in each group. When a user A wishes to change the viewing progress, the user may inquire the streaming server of the group in the network with the viewing progress similar to user A. If such a group exists, the streaming server returns the network address of a user in that group to user A so that user A may join the group through the user described in the returned message. On the other hand, if no such group exists, the streaming server forms a new group and uses user A as the representative of the new group.

The networked transmission technology selects one or more representatives form the I-th group, and relays the stream data segment to the representatives of the (I+1)-th group. Then, the stream data segment is broadcasted within the (I+1)-th group. So that the users of I-th group serve the users of the (I+1)-th group to alleviate the workload of the streaming server. No problem will occur even when the number of the users in I-th group is much different from the number of the users in the (I+1)-th group, or a large number of users join the I-th group.

Figure 1:
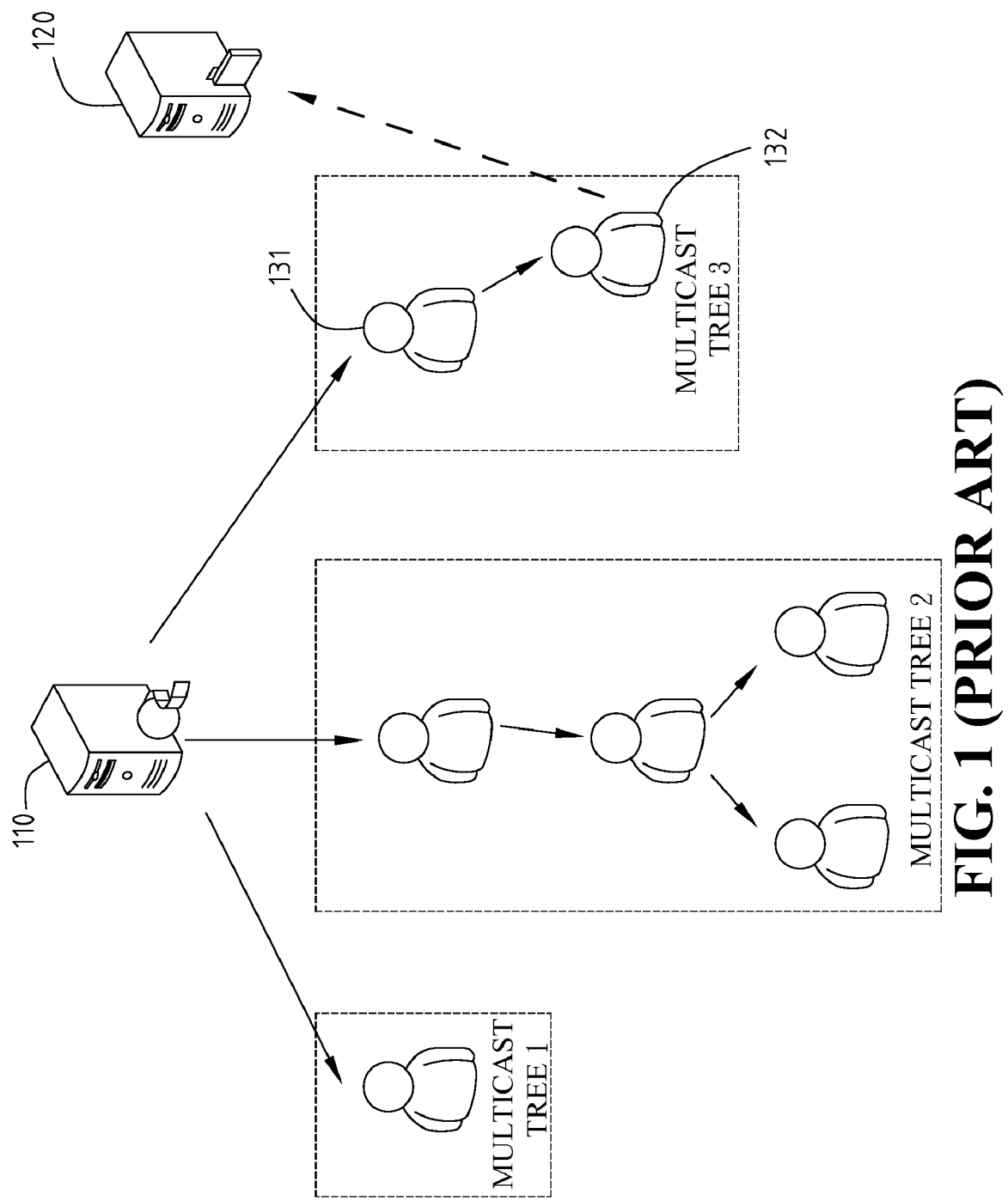
FIG. 1 shows a schematic view of an exemplary peer-to-peer on-demand streaming service technology.
Figure 2:
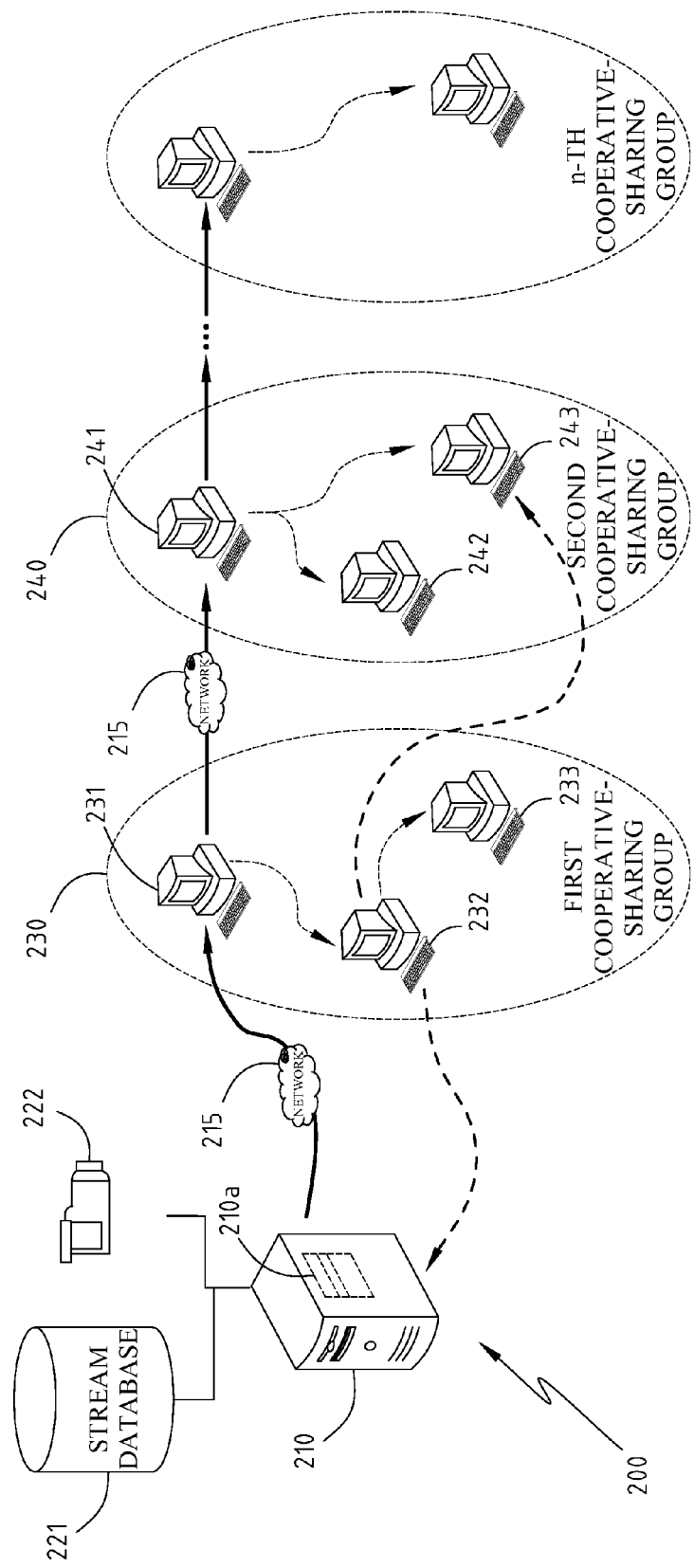
FIG. 2 shows a schematic view of an exemplary networked transmission system for stream data, consistent with certain disclosed embodiments.

FIG. 2 shows a schematic view of an exemplary networked transmission system for stream data, consistent with certain disclosed embodiments. The networked transmission system is applicable to the P2P network communication environments for providing PVR functions. As shown in FIG. 2, networked transmission system 200 comprises a network 215, a streaming server 210, and a plurality of n cooperative-sharing groups defined by streaming server 210, named as first cooperative-sharing group, second cooperative-sharing group, third cooperative-sharing group, . . . , and n-th cooperative sharing group. Each of cooperative-sharing groups consists of a plurality of user terminals, and at least a user terminal is the leader node of the cooperative-sharing group. All the user terminals of the cooperative-sharing group form a cooperative multicasting relation. The streaming server provides a plurality of stream data programs, and each stream data program is divided into a plurality of stream data segments of time length TS. Through network 215, streaming server 210 transmits each stream data segment, one by one, to the leader node of first cooperative-sharing group. Each leader node of each cooperative-sharing group multicasts the current received stream data segment to the user terminals of the same cooperative-sharing group. After a period of time length TS, the current received stream data segment will be relayed to the leader node of the next cooperative-sharing group.

As shown in FIG. 2, streaming server 210 may provide stream data programs through a stream database 221, or play the program through a camcorder 222. For example, the pre-recorded stream data files may be stored in stream database 221, and camcorder 222 may record and play the program. The program files may be either constant bit rate (CBR) coded, or variable bit rate (VBR) coded. Each divided stream data segment of time length TS is a series of stream data. Streaming server 210 may define the time length TS in advance, and takes the time length TS as a unit to define the n cooperative-sharing groups.

The multicast relation among all the user terminals is described as follows. Assume that the initial time $T_{ini}$ of the networked transmission system 200 is normalized to 0. When a plurality of user terminals want to join networked transmission system 200, the plurality of user terminals will be allocated to several different cooperative-sharing groups. For example, first cooperative-sharing group 230 is defined as within the time period 0-TS, second cooperative-sharing group 240 is defined as within the time period TS-2TS, and so on. Terminal 231 is the first user terminal joining networked transmission system 200 for viewing a certain program within time period 0-TS, and thus is allocated to first cooperative-sharing group 230. If other user terminals, such as terminals 232, 233, also join within time period 0-TS to view the same program, terminals 232, 233 will be allocated to the same cooperative-sharing group as terminal 231, i.e., first cooperative-sharing group 230. In addition, terminal 241 is the first user terminal joining networked transmission system 200 for viewing a certain program within time period TS-2TS, and thus is allocated to second cooperative-sharing group 240. If other user terminals, such as terminals 242, 243, also join within time period TS-2TS to view the same program, terminals 242, 243 will be allocated to the same cooperative-sharing group as terminal 241, i.e., second cooperative-sharing group 240. Therefore, each cooperative-sharing group may be formed by at least one user terminal.

Streaming server 210 selects at least a leader from each cooperative-sharing group, i.e., the leader node of the cooperative-sharing group, and records the network address of each leader node. For example, terminal 231 is the leader node of first cooperative-sharing group, and terminal 241 is the leader node of second cooperative-sharing group 240. Streaming server 210 may include a memory space, marked as 210a, for recording the network addresses of leader nodes 231, 241.

Streaming server 210 transmits the stream data segments, one by one, to leader node 231 of first cooperative-sharing group. The transmission speed is about the programming playing speed. In other words, a stream data segment is transmitted in a TS unit. The leader node of each cooperative-sharing group shares the received stream data segment with the other terminals in the same cooperative-sharing group through network and relays the received stream data segment to the leader node of the next cooperative-sharing group. For example, streaming server 210 transmits through network 215 a first data stream segment of one TS unit length to terminal 231. Terminal 231, after having received stream data segment, shares with terminal 232 through the network, and terminal 232 shares the data stream segment with terminal 233 through the network.

After streaming server 210 having transmitted a first stream data segment to terminal 231, terminal 231 waits for a period of time length TS and starts to receive the second stream data segment, and relays through network 215 the previous first stream data segment to leader node 241 of second cooperative-sharing group 240. Leader node 241 of second cooperative-sharing group 240, after having received the stream data segment from terminal 231, shares the stream data segment with terminals 242, 243 of second cooperative-sharing group 240.

In this manner, the leader node of each cooperative-sharing group shares the current received stream data segment with other terminals of the same cooperative-sharing group, and relays the received stream data segment to the leader node of the next cooperative-sharing group after a period of time length TS. The leader node of each cooperative-sharing group operates in the same manner as the leader node of the first cooperative-sharing group.

For example, if a program is divided into 100 stream data segments, the worst case for streaming server 210 is to provide only 50 data streams, and the best case is one data stream. Because the streaming server has a light workload, the construction cost for using high-end server may be saved.

Figure 5:
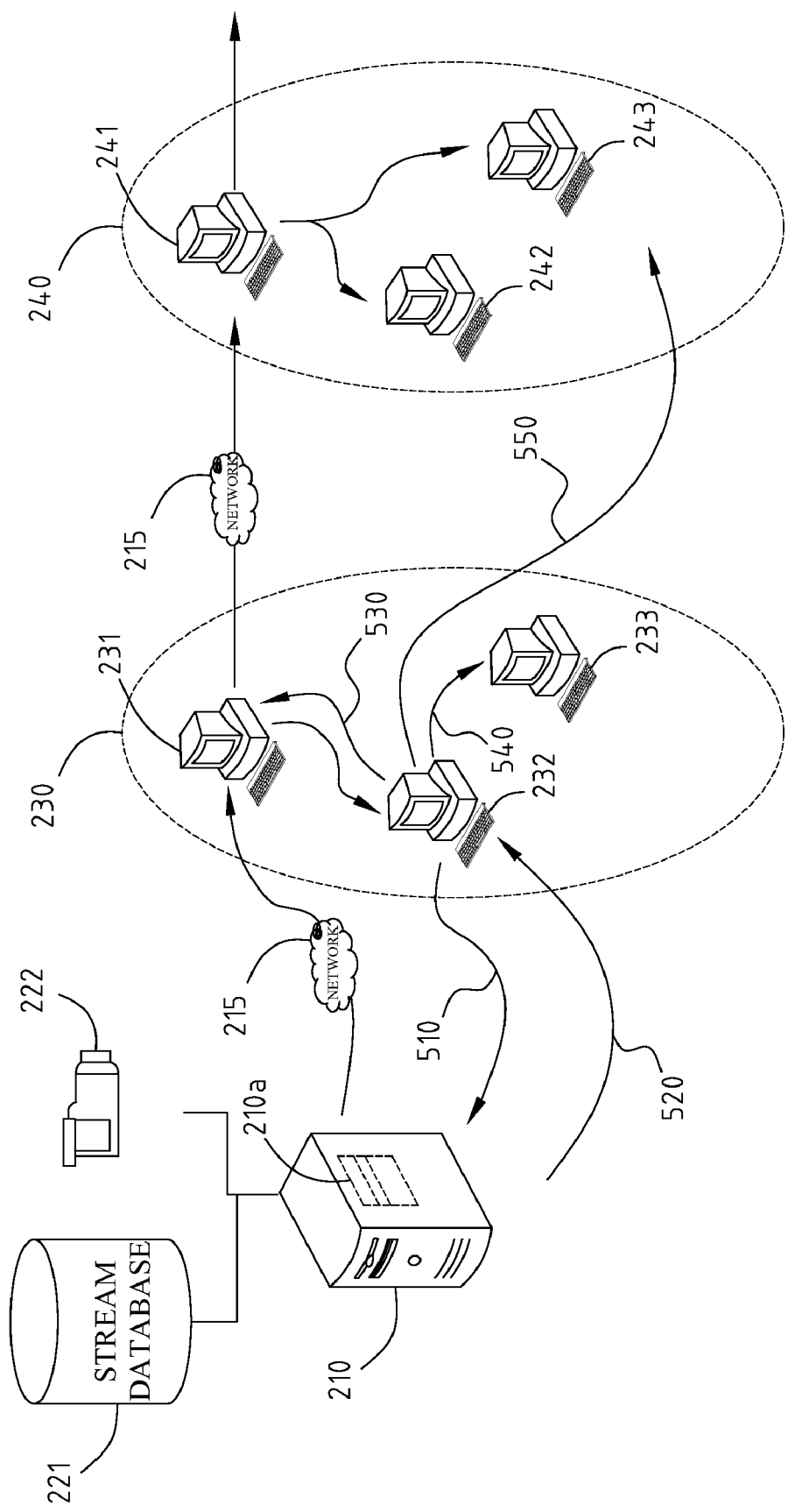
FIG. 5 shows an exemplary flowchart illustrating the operation of the networked transmission system when a user terminal intends to change the playing progress, consistent with certain disclosed embodiments.

Streaming server 210 may also accept inquiries from the terminals. For example, terminals 232 may pass the time of intended viewing stream data segment through an inquiry message to streaming server 210. The user terminal may leave the cooperative-sharing group it originally belongs to and joins another cooperative-sharing group. For example, terminal 232 may leave the first cooperative-sharing group and join the second cooperative-sharing group. FIG. 5 will further provide detailed description.

Figure 3:
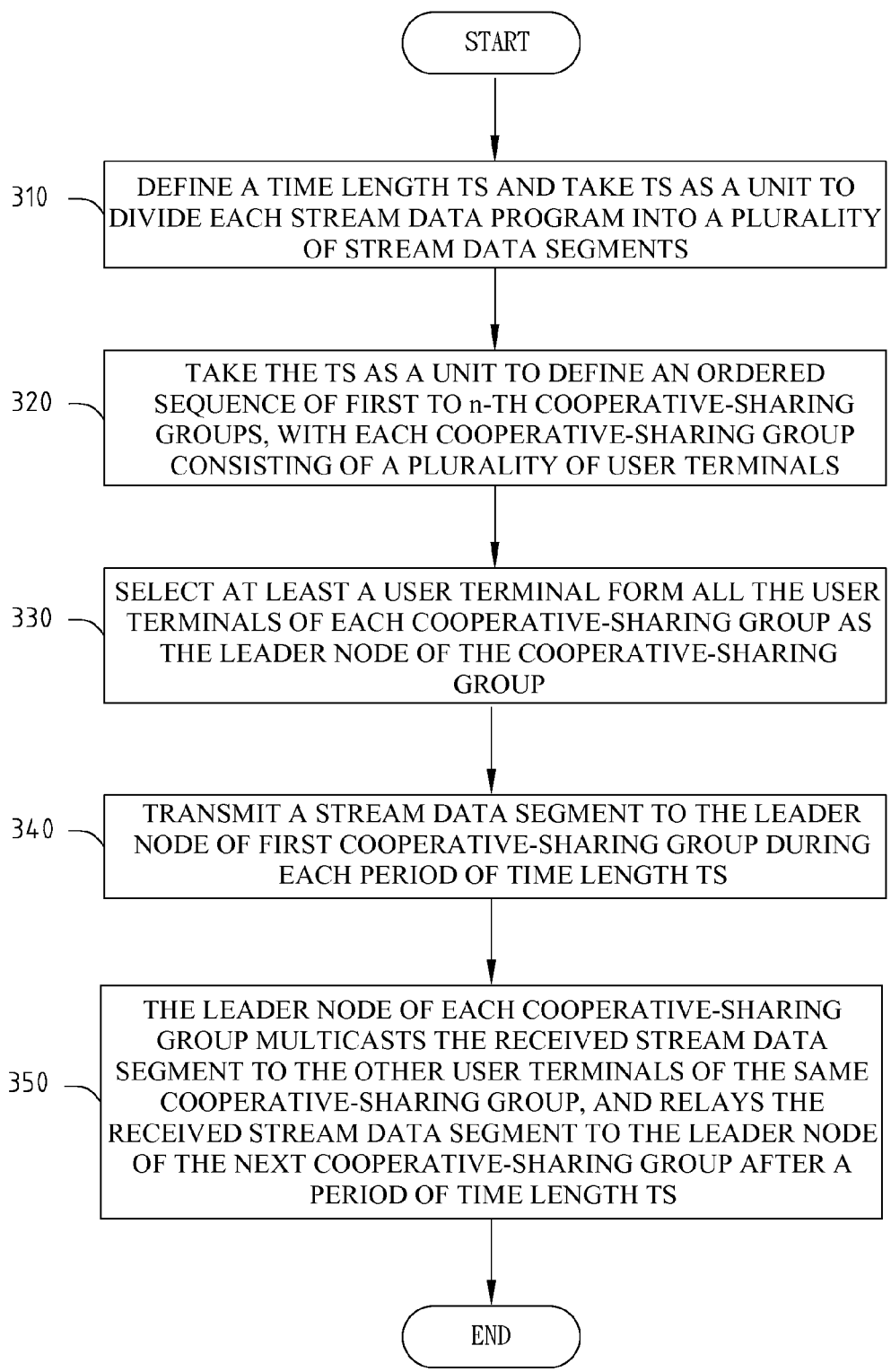
FIG. 3 shows an exemplary flowchart illustrating the operation of the networked transmission system of FIG. 2, consistent with certain disclosed embodiments.

FIG. 3 shows an exemplary flowchart illustrating the operation of the networked transmission system of FIG. 2, consistent with certain disclosed embodiments. As shown in FIG. 3, in step 310, streaming server 210 defines a time length TS and takes TS as a unit to divide each stream data program into a plurality of stream data segments. In step 320, the time length TS is taken as a unit to define an ordered sequence of first to n-th cooperative-sharing groups, with each cooperative-sharing group consisting of a plurality of terminals. In step 330, at least a user terminal is selected from all the user terminals of each cooperative-sharing group as the leader node of the cooperative-sharing group. In step 340, the streaming server transmits a stream data segment to the leader node of the first cooperative-sharing group during each TS time period. In step 350, the leader node of each cooperative-sharing group multicasts the received stream data segment to the other user terminals of the same cooperative-sharing group, and relays the received stream data segment to the leader node of the next cooperative-sharing group after a period of time length TS.

Therefore, streaming server 210 according to the present invention only needs to store the original stream data of all the programs without the needs to increase the storage space or bandwidth because the number of users increases. The user terminal does not need to download the entire program. The user terminal of non-leader node only requires a buffer sufficient to store a stream data segment of a period of time length TS. On the other hand, a user terminal of leader node will require a buffer sufficient to store two stream data segments because the leader node needs to relay the previous stream data segment to the leader node of the next cooperative-sharing group.

Streaming server 210 may adopt a plurality of transmission protocols, such as Real-Time Transport Protocol (RTP), Hypertext Transfer Protocol (HTTP), Multimedia Messaging Service (MMS), or self-defined transmission protocols, to transmit the stream data segments to the leader node of the cooperative-sharing group. The leader node may share the received stream with other nodes in the same cooperative-sharing group and relay to the leader node of the next cooperative-sharing group.

In addition to relieving the workload of the streaming server, the user may also view the program on-demand and execute the VCR functions, such as random seek or pause. The user does not need to add new hardware equipment, and the service provider does not need to set up an expensive server to serve a large number of users.

In networked transmission system 200, the user terminal may execute operations, such as joining to the system, changing play progress, and departing the system. The following describes the details of these operations.

As aforementioned, the streaming server defines the time length TS, takes TS as a unit to divide a stream data program into a plurality of stream data segments, and defines an ordered sequence of cooperative-sharing groups.

Figure 4:
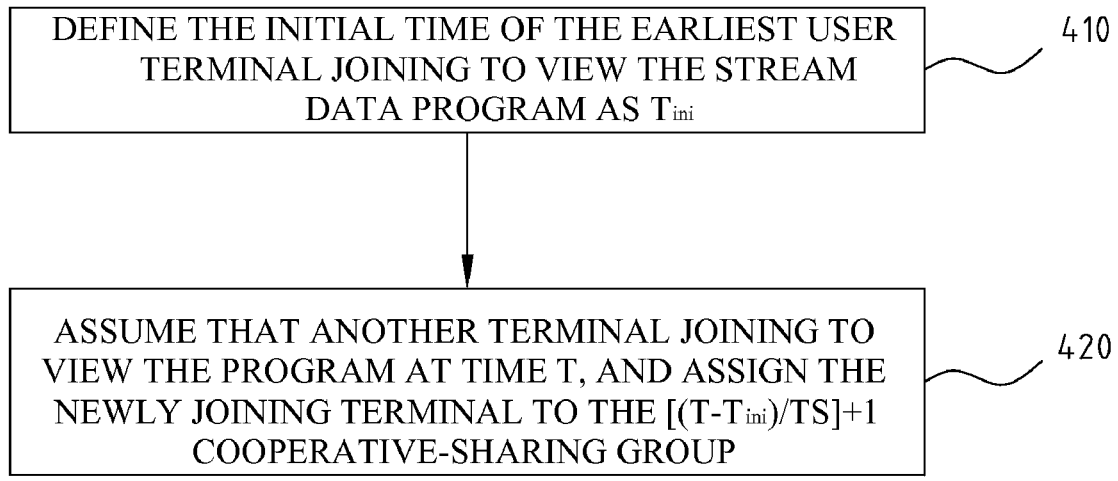
FIG. 4 shows an exemplary flowchart illustrating the operation of the networked transmission system when a user terminal intending to join the networked transmission system, consistent with certain disclosed embodiments.

FIG. 4 shows an exemplary flowchart illustrating the operation of the networked transmission system when a user terminal intends to join the networked transmission system, consistent with certain disclosed embodiments. Referring to FIG. 4, in step 410, the initial time of the earliest terminal joining to view the stream data program is defined as $T_{ini}$. In step 420, it is assumed that another terminal joining to view the program at time T, and streaming server 210 assigns the newly joining terminal to the $[(T-T_{ini})/TS]+1$ cooperative-sharing group, where [ ] is the Gaussian integer. Therefore, the terminals assigned to the same group have similar viewing progress, and the distance between them is less than the time length TS.

Then, streaming server 210 responds to the terminal with the network address of at least a leader node of the $[(T-T_{ini})/TS]+1$ cooperative-sharing group. The user terminal may request to the leader node of the $[(T-T_{ini})/TS]+1$ cooperative-sharing group for joining the $[(T-T_{ini})/TS]+1$ cooperative-sharing group.

After joining a cooperative-sharing group, all the user terminals of that cooperative-sharing group form a cooperative-sharing multicasting relation. The establishing of the multicasting relation may be accomplished through technologies, such as, SpreadIt, Yoid, Narada, CoopNet, BiTos, and so on.

If the system provider provides the live program that is also currently being recorded, the new user terminal may join the first cooperative-sharing group so that the user terminal may view the live program upon joining.

Use first cooperative-sharing group 230 and second cooperative-sharing group 240 of FIG. 2 as examples. When viewing a stream data program, if one of the user terminals intends to change the playing progress, such as rewind (for reviewing previous stream segment) or fast forward, streaming server 210 will receive the request from the user terminal and execute the inquiry and response about switching the requesting user terminal to another cooperative-sharing group. FIG. 5 shows an exemplary flowchart illustrating the operation of the networked transmission system when a user terminal intends to change the playing progress, consistent with certain disclosed embodiments.

Referring to FIG. 5, when user terminal 232 is viewing a stream data program, user terminal 232 transmits a playing time $T_{new}$ for an interesting stream data segment to streaming server 210 through an inquiry message, marked as 510. Streaming server 210 computes the cooperative-sharing group to which time $T_{new}$ belongs; for example, second-cooperative-sharing group 240, and returns the network address of leader node 241 of second cooperative-sharing group 240 to user terminal 520.

Then, user terminal 232 informs the parent node, i.e. leader node 231 of first cooperative-sharing group 230 in the example, of the switching to another cooperative-sharing group, i.e., second cooperative-sharing group 240 so that parent node 231 is no longer required to serve, marked as 530.

If user terminal 232 has its own child nodes, user terminal 232 must inform the child nodes of the switching to another cooperative-sharing group so that the child nodes may search for a new parent node in first cooperative-sharing group 230. For example, user terminal 232 informs child node 233 of the switching to another cooperative-sharing group, and asks child node 233 to search for another parent node, marked as 540.

Then, user terminal 232 sends a join message to leader node 241 of second cooperative-sharing group 240 it intends to join, marked as 550. If user terminal 232 is a leader node, user terminal 232 informs streaming server 210 to select another leader node. User terminal 232 joins second cooperative-sharing group 240 and starts to receive the stream data segment at time $T_{new}$.

If the user terminal fast forwards or rewinds into an empty cooperative-sharing group, the streaming server will serve the user terminal directly, and makes the user terminal as the leader node of the empty cooperative-sharing group. If the user terminal is viewing the live program concurrently recorded by a camcorder, the fast forward function cannot exceed the newest progress that the camcorder is able to provide.

Figure 6:
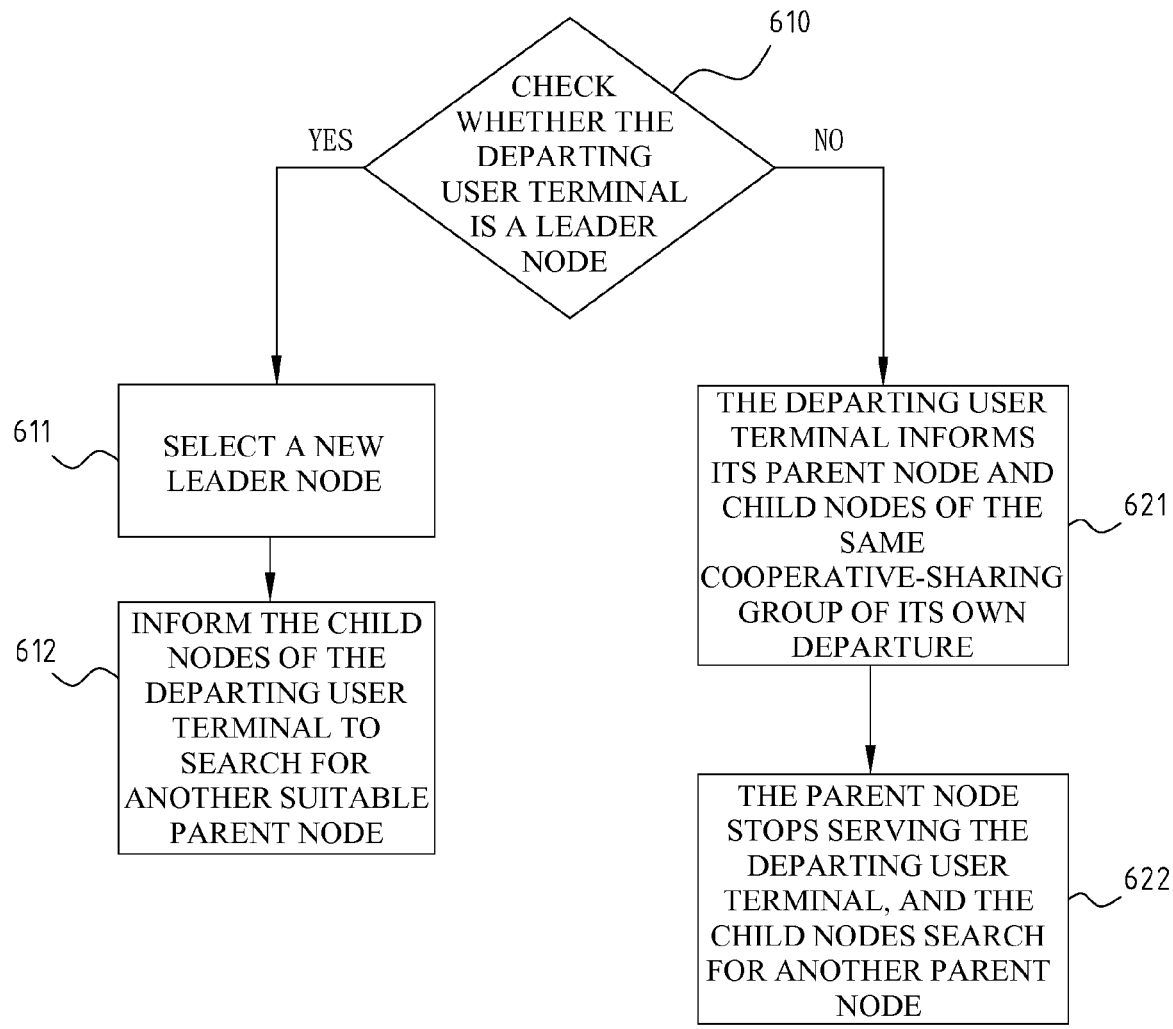
FIG. 6 shows an exemplary flowchart illustrating the operation of the networked transmission system when a user terminal intending to depart from the networked transmission system, consistent with certain disclosed embodiments.

FIG. 6 shows an exemplary flowchart illustrating the operation of the networked transmission system when a user terminal intends to depart from the networked transmission system, consistent with certain disclosed embodiments. Referring to FIG. 6, in step 610, streaming server 210 checks whether the departing user terminal is a leader node. If so, as shown in step 611, streaming server 210 selects a new leader node; for example, selecting a node having better capability and belonging to the same cooperative-sharing group as the departing user terminal. And as shown in step 612, streaming server 210 informs the child nodes of the departing user terminal to search for another suitable parent node.

If the departing user terminal is not a leader node, the departing user terminal must inform its parent node and child nodes of the same cooperative-sharing group of its own departure, as shown in step 621. The parent node will stop serving the departing user terminal, and the child nodes will search for another parent node, as shown in step 622.

To prevent the user terminal from departing the system in an abnormal manner, such as, network disconnection, power outage, forced shutdown of application, and so on, the user terminals may check their parent nodes and child nodes periodically to ensure their presence. If a child node is found missing, the service to that child node is stopped, and if a parent node is found missing, another parent node will be searched for.

When a playing progress is paused by a user terminal, the playing progress at the paused time must be remembered. During the pause, the original stream data will continuously be downloaded. Therefore, when the user terminal resumes playing, the aforementioned rewind function must be used to return to the playing progress before the pause. In this manner, the user terminal does not need to depart from the current cooperative-sharing group, and may continue to receive and relay the stream data for other nodes.

When the user terminal joins the system, changes the playing progress or departing from and rejoins the system, if the user terminal joins an empty cooperative-sharing group, the streaming server will serve the user terminal directly and select the user terminal as the leader node of the new cooperative-sharing group.

Figure 7:
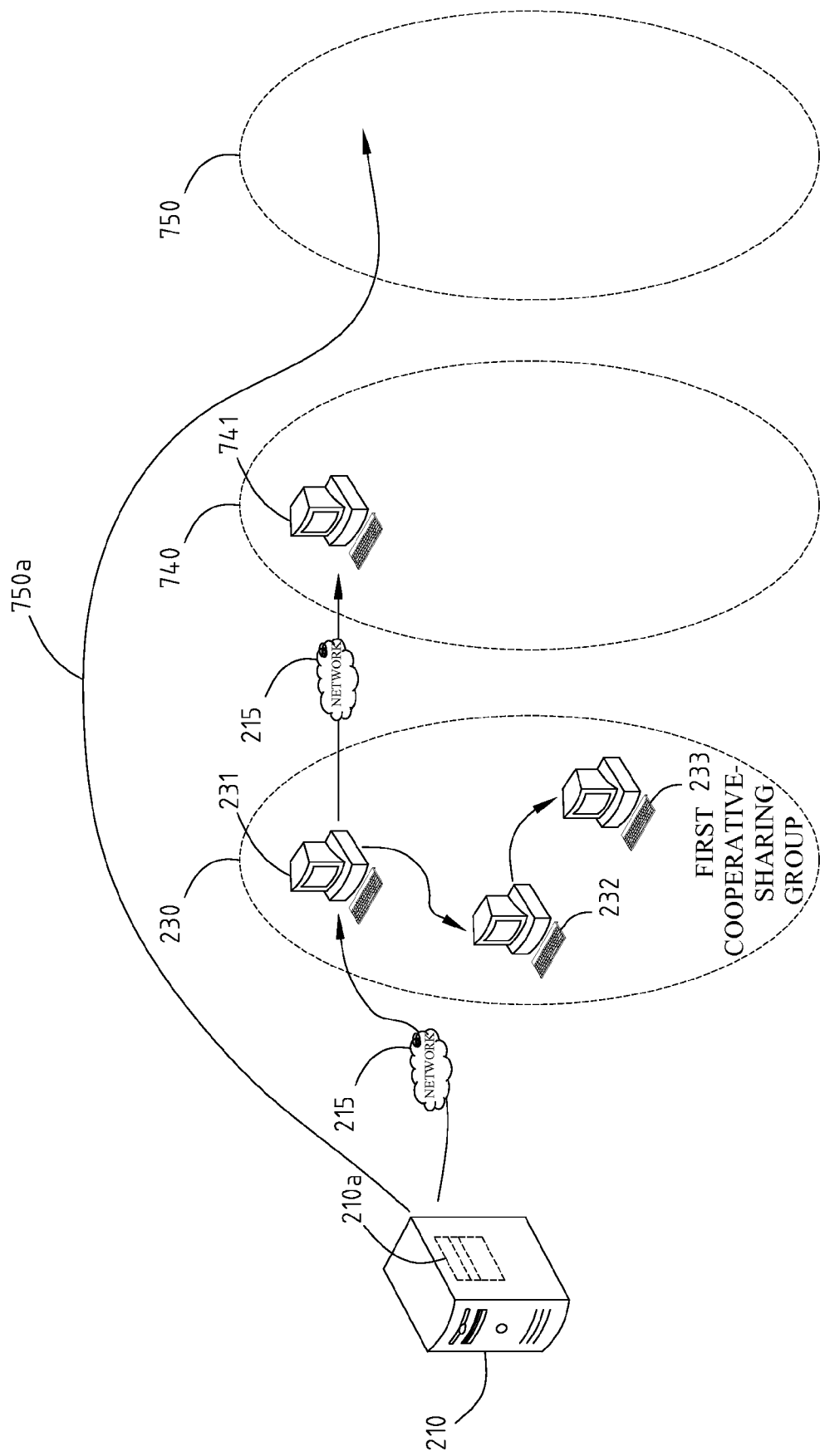
FIG. 7 shows an exemplary schematic view of the discontinuity of a stream data program between cooperative-sharing groups.

When a stream data program is less popular and having few viewers, the discontinuity between cooperative-sharing groups may occur. As shown in FIG. 7, third cooperative-sharing group 750 is formed at a later time, and leader node 741 of previous cooperative-sharing group 740 no longer has the first data stream segment. In this case, cooperative-sharing group 750 must be served by streaming server 210 directly, marked as 750a. Therefore, in the worst case for networked transmission system 200; that is, when all the even-numbered cooperative-sharing groups are empty, streaming server 210 only needs to provide 1/2*(D/TS) data streams, where D is the time length of a stream data program. In other words, the stream data program is divided into D/TS stream data segments. For example, if a stream data program is divided into 100 stream data segments, the streaming server according to the present invention only needs to provide 50 data streams in the worst case, while it only needs to provide 1 data stream in the best case. Hence, the workload of the streaming server is low even in the worst case.

In summary, in the disclosed exemplary embodiments, the streaming server defines an ordered sequence of n cooperative-sharing groups, number as $1^{st}$ to n-th. The leader node of each cooperative-sharing group multicasts the current received stream data segment to the user terminals of the same cooperative-sharing group, and relays the stream data segment to the leader node of the next cooperative-sharing group after a period of time length. All the programs provided by the streaming server may be viewed on demand, and the user terminal may execute the VCR functions, such as, random seek or pause. The equipment for the user to view the program only requires a small amount of memory. With the present invention, the system provider does not need to construct expensive server to provide the pre-recorded and live programs, while the user does not require expensive hardware to view the program. The program files may be CBR encoded or VBR encoded.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A networked transmission system for stream data, comprising:
    a network;
    a streaming server, for providing a plurality of stream data programs, with each stream data program being divided into a plurality of stream data segments according to a predefined time length;
    an ordered sequence of n cooperative-sharing groups for receiving a specific stream data program, numbered from $1^{st}$ to n-th, with n being an integer, each group of said n cooperative-sharing groups being formed by a plurality of user terminals requesting said streaming server for said specific stream data program with a user terminal of said plurality of user terminals being selected by said streaming server as a leader node of the cooperative-sharing group, wherein the user terminals of the k-th cooperative-sharing group request said streaming server for said specific stream data program in a time period of (k−1) to k times said predefined time length later than first request of said specific stream data program by the user terminals of the $1^{st}$ cooperative-sharing group, with $1 \leq k \leq n$;

where said streaming server transmits said plurality of stream data segments, one by one, through said network to said leader node of the first cooperative-sharing group, said leader node of each cooperative-sharing group multicasting each currently received stream data segment peer-to-peer to all the user terminals within the same cooperative-sharing group, and relaying said currently received stream data segment to the leader node of a next cooperative-sharing group after said predefined time length.

2. The system as claimed in claim 1, wherein each operation that a user terminal executes is one of operations including joining said system, changing playing progress, and departing from said system.

3. The system as claimed in claim 2, wherein when a user terminal is joining said system, said streaming server responds to said user terminal with a network address of the leader node of the cooperative-sharing group which said user terminal is joining.

4. The system as claimed in claim 2, wherein when a user terminal changes playing progress, said streaming server receives a changing request from said user terminal and conducts a search and responses to said user terminal for switching to another cooperative-sharing group.

5. The system as claimed in claim 2, wherein when a user terminal which is a leader node of one of said n cooperative-sharing groups departs from said system, said streaming server selects another user terminal within the original cooperative-sharing group of the departing user terminal as a new leader node of the original cooperative-sharing group.

6. The system as claimed in claim 2, wherein when a user terminal joins said system, changes playing progress, or departs from and re-joins said system, if said user terminal joins an empty cooperative-sharing group, said streaming server directly serves said user terminal and said user terminal becomes the leader node of said empty cooperative-sharing group.

7. The system as claimed in claim 1, wherein said streaming server has a memory space for recording a network address of each leader node of each of said n cooperative-sharing groups.

8. The system as claimed in claim 1, wherein the speed of said streaming server transmitting stream data segment is greater than or equal to the speed of program playing.

9. The system as claimed in claim 1, wherein said streaming server has a buffer for storing the original stream data of said plurality of stream data programs.

10. The system as claimed in claim 1, wherein the leader node of each of said n cooperative-sharing groups has a buffer for storing the stream data segments of two periods of said time length, and each user terminal of non-leader nodes has a buffer for storing the stream data segment of a period of said time length.

11. The system as claimed in claim 1, wherein said streaming server takes said time length as a unit to define said ordered sequence of said n cooperative-sharing groups, numbered $1^{st}$ to n-th.

12. A networked transmission method for stream data, applicable to a networked transmission system, said method comprising:

defining a time length TS, and taking said time length as a unit to divide each of a plurality of stream data programs provided by a streaming server into a plurality of stream data segments;

taking said time length as a unit to define an ordered sequence of n cooperative-sharing groups for receiving a specific stream data program, numbered $1^{st}$ to n-th, each cooperative-sharing group being formed by a plurality of user terminals requesting said streaming server for said specific stream data program;

using said streaming server to select a user terminal from each group of said n cooperative-sharing groups as a leader node of the cooperative-sharing group;

during each period of said time length, transmitting a stream data segment from said streaming server to the leader node of the first cooperative-sharing group; and using the leader node of each group of said n cooperative-sharing groups to multicast each currently received stream data segment peer-to-peer to other user terminals of the same cooperative-sharing group, and after a period of said time length, to relay said currently received stream data segment to the leader node of a next cooperative-sharing group;

wherein the user terminals of the k-th cooperative-sharing group request said streaming server for said specific stream data program in a time period of (k−1) to k times TS later than first request of said specific stream data program by the user terminals of the $1^{st}$ cooperative-sharing group, with $1 \leq k \leq n$.

13. The method as claimed in claim 12, wherein said method further includes operations of a user terminal joining said system, a user terminal changing playing progress, and a user terminal departing from said system, or any combinations of the above.

14. The method as claimed in claim 13, wherein the operation of a user terminal joining said system further includes:

defining an initial time of an earliest user terminal joining to view a stream data program as $T_{ini}$; and assigning said user terminal and subsequent user terminals joining said system to the $[(T-T_{ini})/TS]+1$ cooperative-sharing group, where [ ] is a Gaussian integer, and T is the joining time at which each said subsequent user terminal joins to view said stream data program.

15. The method as claimed in claim 13, wherein the operation of a user terminal changing playing progress further includes:

said user terminal transmitting a new time $T_{new}$ of playing progress for an interesting data stream segment to said streaming server through an inquiry message;

said streaming server computing which cooperative-sharing group is currently multicasting the stream data segment which said $T_{new}$ belongs to, and returning a network address of the leader node of the multicasting cooperative-sharing group to said user terminal;

said user terminal informing a parent node in the original cooperative-sharing group of said user terminal of switching to another cooperative-sharing group; and said user terminal sending a join message to the leader node of the multicasting cooperative-sharing group to be switched to.

16. The method as claimed in claim 15, wherein when said user terminal is connected to at least a child node, said user terminal informs said at least a child node of said switching, and asks each of the child nodes to search for another user terminal in the original cooperative-sharing group as the parent node.

17. The method as claimed in claim 15, wherein when said user terminal is a leader node of the original cooperative-sharing group, said user terminal requests said streaming server to select another leader node for the original cooperative-sharing group.

18. The method as claimed in claim 13, wherein when a user terminal changes playing progress and switches to an empty cooperative-sharing group, said streaming server directly serves said user terminal and selects said user terminal as the leader node of said empty cooperative-sharing group.

19. The method as claimed in claim 13, wherein the operation of a user terminal departing from said system further includes:

checking whether the departing user terminal is a leader node;

if so, selecting a new leader node and informing all child nodes of the departing user terminal to search for another parent node within the original cooperative-sharing group of the departing user terminal; and otherwise, informing a parent node and all child nodes of the departing user terminal that the user terminal is departing.

20. The method as claimed in claim 19, wherein when the departing user terminal is not a leader node, the method further includes the steps of said parent node stopping serving the departing user terminal and said child nodes searching for other parent nodes.

* * * * *